United States Patent [19]
Miyazaki et al.

[11] Patent Number: 5,514,850
[45] Date of Patent: May 7, 1996

[54] DEFECT COMPENSATION METHOD FOR SMOOTHING A SURFACE OF A TRANSPARENT PLATE WITH AN ARF EXCIMER LASER BEAM

[75] Inventors: Osamu Miyazaki; Kazuya Yoshimura, both of Tenri; Syunji Nakai, Moriguchi, all of Japan

[73] Assignee: Sharp Kabushiki Kaisha, Osaka, Japan

[21] Appl. No.: 64,275

[22] Filed: May 19, 1993

[30] Foreign Application Priority Data

| Jun. 30, 1992 | [JP] | Japan | 4-173339 |
| Sep. 1, 1992 | [JP] | Japan | 4-233948 |
| Sep. 1, 1992 | [JP] | Japan | 4-233950 |
| Jan. 26, 1993 | [JP] | Japan | 5-011191 |

[51] Int. Cl.$^6$ .................................................. B23K 26/00
[52] U.S. Cl. ........................ 219/121.69; 219/121.85; 359/82
[58] Field of Search ................... 219/121.6, 121.65, 219/121.66, 121.85, 121.73, 121.68, 121.69, 121.75; 359/58, 59, 67, 82

[56] References Cited

U.S. PATENT DOCUMENTS

| 4,338,114 | 7/1982 | Brockway et al. | 219/121.85 |
| 4,444,801 | 4/1984 | Hongo et al. | 219/121.85 |
| 4,478,677 | 10/1984 | Chen et al. | 156/635 |
| 4,609,566 | 9/1986 | Hongo et al. | 219/121.6 |
| 4,729,372 | 3/1988 | L'Esperance, Jr. | 219/121.73 |
| 4,861,964 | 8/1989 | Sinohara | 219/121.68 |
| 4,871,415 | 10/1989 | Park et al. | 219/121.6 |
| 4,911,711 | 3/1990 | Telfair et al. | 219/121.6 |
| 4,980,534 | 12/1990 | Okamoto et al. | 219/121.6 |
| 5,017,755 | 5/1991 | Yahagai et al. | 219/121.68 |
| 5,091,626 | 2/1992 | Lewis et al. | 219/121.69 |
| 5,121,236 | 6/1992 | Ukai et al. | 359/59 |
| 5,142,386 | 8/1992 | Ishihara | 359/58 |
| 5,175,504 | 12/1992 | Henley | 219/121.68 |
| 5,280,374 | 1/1994 | Nakai et al. | 359/67 |
| 5,313,043 | 5/1994 | Yamagishi | 219/121.68 |
| 5,365,034 | 11/1994 | Kawamura et al. | 219/121.69 |

FOREIGN PATENT DOCUMENTS

| 0224322 | 6/1987 | European Pat. Off. . |
| 0346116 | 12/1989 | European Pat. Off. . |
| 4018135 | 12/1990 | Germany . |
| 3-126913 | 5/1991 | Japan . |

OTHER PUBLICATIONS

R. L. Waters et al., *Society for Information Display–Application Notes*, No. 30.2:39–42 (1992).

S. Ishizaka, *Ohyo Kikai Kogaku*, Sep. 1990, "Utilization of Excimer Laser for Precise Processing", pp. 1–7.

*Primary Examiner*—Geoffrey S. Evans
*Attorney, Agent, or Firm*—David G. Conlin; Peter F. Corless

[57] ABSTRACT

A defect compensation method for smoothing a surface of a transparent plate by radiating an ArF excimer laser beam to a defect at the surface. The ArF excimer laser beam is radiated by use of a mask having an opening which is shaped in accordance with the shape of the defect, through a lens, or while the size of the beam at the defect is changed to a plurality of values. As the mask, an iris mask having an opening which is larger than the defect is usable. The size of the beam is changed by exchanging, a plurality of masks each having an opening of a different size from one another, or by use of a mask having a plurality of openings of different sizes. Alternatively, the ArF excimer laser beam is radiated so as to have an energy which is high at a center and low at a periphery of the defect. Or, the ArF excimer laser beam has a smaller size than the size of the defect, and the transparent plate having the defect is moved so as to allow different portions of the defect to be irradiated sequentially by the ArF excimer laser beam and simultaneously the number of shots of the ArF excimer laser beam is changed.

25 Claims, 6 Drawing Sheets

DEFECT COMPENSATION METHOD FOR SMOOTHING A SURFACE OF A TRANSPARENT PLATE WITH AN ARF EXCIMER LASER BEAM

BACKGROUND OF THE INVENTION

1. Field of the Invention

The present invention relates to a defect compensation method for compensating for a defect generated at a surface of a plate formed of a transparent material such as glass without spoiling the light transmitting property thereof. In particular, the present invention relates to a defect compensation method for compensating for a microscopic concave defect at a display plane of a display apparatus such as a liquid crystal display apparatus.

2. Description of the Related Art

When a linear or point concave defect such as a flaw, a scratch, a crack or the like is generated at a display plane of a display apparatus or the like, light radiated to the display plane is scattered or reflected by the defect, thereby adversely effecting the resultant display. In order to avoid such an inconvenience, defect compensation is performed for avoiding such a concave defect from effecting the display.

Conventionally, the defect compensation is performed in the following manner. By rotating a buff or the like coated with fine rubbing powders or by rotating a grinder coated with a rubbing liquid including rubbing powders, a portion including the concave defect is mechanically rubbed and thus removed by friction. Since such methods involve the following problems, a surface obtained by this type of defect compensation is not satisfactory. Hereinafter, the surface obtained by the defect compensation will be referred to as a "processed surface".

(1) Powders chipped away from the display plane formed of glass or the like and the rubbing powders splashed by rubbing causes problems in terms of cleanliness of the operational environment.

(2) In the case where the display plane is combined with a substrate including an LSI or the like, the LSI may be destroyed by vibration caused by rubbing. Further, static electricity generated by rubbing friction may destroy a thin film transistor or a driving circuit provided in the substrate.

(3) Powders of glass which have been rubbed off or rubbing powders enter the display apparatus to cause a display malfunction.

(4) The rubbing process requires a long period of time, which increases the compensation cost.

(5) Since the display plane treated with rubbing becomes rough with microscopic ruggedness, the light transmitting property of the display plane is spoiled. This fact provides another display defect.

Recently, the use of excimer laser for smoothing a portion including the defect has been developed. For example, examples of utilization of excimer laser for precise processing of a polymer film or a ceramic material or for marking at a plastic or ceramic material are described in "Excimer Laser niyoru Bisai Kako eno Ohyo (Utilization of Excimer Laser for Precise Processing)" in *Ohyo Kikai Kogaku* (September, 1990). The processing described in this article is used for forming a hole, cutting, marking or the like, but not for smoothing the processed surface in order to reliably maintain the light transmitting property, which is indispensable for the defect compensation of a transparent plate of a display apparatus.

The use of a laser beam for the defect compensation in a liquid crystal display apparatus has also been developed. For example, Japanese Laid-Open Patent Publication No. 3-126913 discloses a method for separating a pair of substrates of a liquid crystal display apparatus by radiation of a laser beam. This method, according to which the laser beam is transmitted through the substrates, cannot be used for the defect compensation of the substrate itself. Japanese Laid-Open Patent Publication No. 3-265820 discloses a method for compensating for a defect by radiating a laser beam to a surface of a substrate of the liquid crystal display apparatus. According to this method, the surface is roughened to make a portion including the defect non-transparent, but not smoothed. The rough surface obtained by this method does not have a satisfactory light transmitting property, which may provide another defect.

SUMMARY OF THE INVENTION

A defect compensation method for smoothing a surface of a transparent plate according to the present invention is performed by radiating an ArF excimer laser beam to a defect at the surface.

An ArF excimer laser has a wavelength in the range of ultraviolet. By the use of ultraviolet, bonds between atoms of a transparent plate are disbonded. Accordingly, a portion irradiated by the ultraviolet is removed so as to form a substantially smooth surface, and thus the transparent surface maintains a satisfactory light transmitting property.

In the case where the ArF excimer laser beam is radiated while the size of the beam at the defect is changed, or the ArF excimer laser beam is radiated so as to have an energy which is high at a center and low at a periphery of the defect, a processed surface which is deep at a center and gets gradually shallow toward a periphery thereof is obtained.

In the case where the ArF excimer laser beam is radiated through a mask having an opening of the shape corresponding to the shape of the defect, a processed surface which is smooth with no microscopic ruggedness is obtained. Accordingly, the transparent plate maintains a satisfactory light transmitting property. Further, in the case where the degree of focus of the ArF excimer laser beam is changed and also the transparent plate having the defect is moved so as to allow different portions thereof to be irradiated sequentially by the ArF excimer laser beam, a profile or a peripheral edge of a processed surface is unclear. Such a processed surface is satisfactory since the profile is hardly visually recognized as a shadow. The profile of a processed surface can also be made unclear by changing the diameter of an iris mask during the radiation of the ArF excimer laser beam.

Thus, the invention described herein makes possible the advantages of providing a defect compensation method for smoothing a surface of a transparent plate, according to which a defect at a surface of a transparent plate is compensated for without spoiling the light transmitting property of the surface or generating residual powders and in a short period of time.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating examples with reference to the accompanying drawings.

Figure 3:
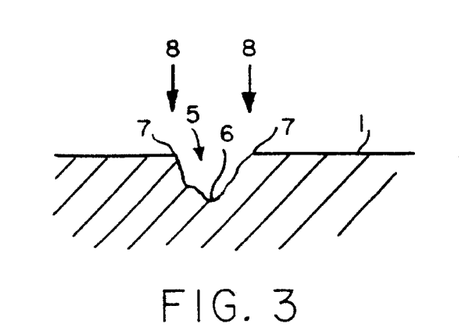
FIG. 3 is a view schematically illustrating ArF excimer laser radiation to a surface of a transparent plate.

When a defect is generated in the form of a point or a line and in various sizes and shapes at a surface of a transparent plate formed of a glass or the like, such a defect has an adverse effect on the quality of a display plane. FIG. 3 shows an example of a cross section of such a defect 5 at a transparent plate 1 formed of glass. The defect 5 is compensated for so as to be visually unrecognizable by defect compensation. The defect compensation is performed by radiating an ArF excimer laser beam 8 to the defect 5 or a portion including the defect (hereinafter, referred to as a "defect portion").

An excimer laser emitter is a type of gas laser emitter for emitting a laser beam by use of a rare gas halogen, which forms a compound in an excited state. The excimer laser emitter can emit a laser beam having a wavelength in the range of ultraviolet. The laser beam having a wavelength in the range of ultraviolet has a high energy, and thus realizes processing having the following features.

(1) Since bonds between molecules and atoms are photochemically disbonded, thereby decomposing and thus removing a portion of a surface layer treated with radiation, the surface is exposed to no thermal effect.

(2) Since such a laser beam has the shortest wavelength among various types of laser beams used for processing, processing is possible in the order of microns.

According to the present invention, the ArF excimer laser beam is used for processing for the following reasons.

In processing a transparent material such as glass, a laser beam having a certain range of wavelength is transmitted through the material and cannot disbond the bonds between atoms. In order to avoid such an inconvenience, the excimer laser beam is required to have such a wavelength that allows the laser beam to be absorbed into the surface of the transparent material. Different types of excimer laser beams have different oscillating wavelengths in accordance with the type of gas used. For processing a transparent material such as glass, a KrF excimer laser beam having a wavelength of 248 nm or an ArF excimer laser beam having a wavelength of 193 nm can be used.

Figure 1:
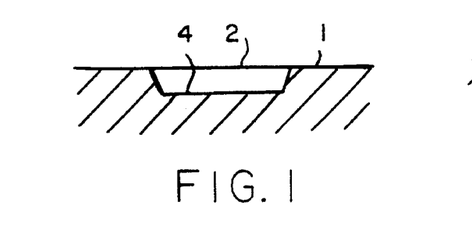
FIG. 1 is a cross sectional view of a portion obtained by ArF excimer laser radiation.
Figure 2:
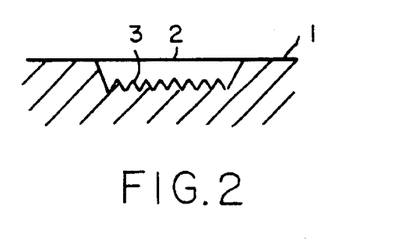
FIG. 2 is a cross sectional view of a portion obtained by KrF excimer laser radiation.

FIG. 1 is a cross sectional view of a portion processed by use of an ArF excimer laser beam, and FIG. 2 is a cross sectional view of a portion processed by use of a KrF excimer laser beam. Reference numeral 2 denotes a portion receiving the ArF excimer laser beam (hereinafter, referred to as a "radiation portion"), and reference numeral 4 denotes a processed surface.

As is understood by FIGS. 1 and 2, in the case where the KrF excimer laser beam is used, a processed surface 3 in FIG. 2 is rough with microscopic ruggedness. Accordingly, the light transmitting property of the display plane is poor. In contrast, the ArF excimer laser beam has a shorter wavelength than that of the KrF excimer laser beam. Accordingly, processing in a more microscopic order is possible, and thus the material is less effected by heat. As a result, a processed surface 4 in FIG. 1 is smooth with no microscopic ruggedness. In this state, the light transmitting property of the display plane is not spoiled.

EXAMPLE 1

Figure 5:
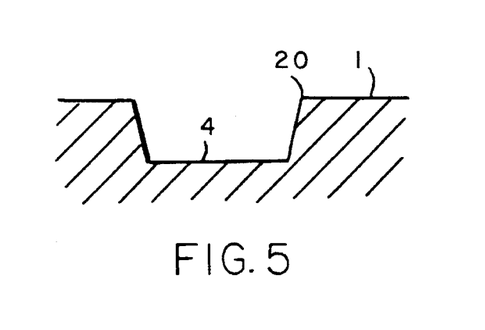
FIG. 5 is a cross sectional view of a portion obtained by ArF excimer laser radiation.

When a defect 5 is generated at a surface of a transparent plate 1 formed of glass or the like as is shown in FIG. 3, an ArF excimer laser beam 8 is radiated to the defect 5 from above. FIG. 5 shows a cross sectional view of a portion obtained by such defect compensation. As is shown in FIG. 5, a processed surface 4 is smooth with no microscopic ruggedness.

Figure 4:
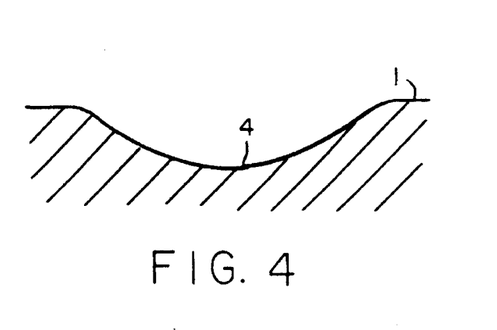
FIG. 4 is a cross sectional view of a portion obtained by a defect compensation method according to the present invention.

Further, by radiating the ArF excimer laser beam 8 to a defect portion including the defect 5 (accordingly, larger than the defect 5), the defect portion is not wholly removed at one time, but is gradually shaved from an upper portion 7 to a bottom portion 6. Finally, a processed surface 4 which is slightly deep at a center and gets gradually shallower toward a periphery thereof to be continuous to the surface of the transparent plate 1 surrounding the processed surface 4 is obtained as is shown in FIG. 4. The resultant processed surface 4 does not have any edge 20, which is obtained in the case shown in FIG. 5. Due to the smoothness of the processed surface 4, the light transmitting property of the display plane is not spoiled.

Moreover, since the defect compensation process according to this example requires only a short period of time of several tens of seconds, the compensation cost can be reduced.

Excision of the transparent plate 1 splashes a small amount of powders of glass or the like, but this amount is significantly smaller than the case in which the transparent plate is rubbed by use of rubbing powders. In order to avoid the splashed powders from adhering to the processed surface 4, an area which is not to be irradiated by the ArF excimer laser beam may be masked by a masking tape or the like.

Still further, a pattern mask may be provided on a path of the laser beam to obtain a desirable beam size and shape. The laser beam may be radiated through a lens to obtain a desirable beam size and intensity.

EXAMPLE 2

Figure 6:
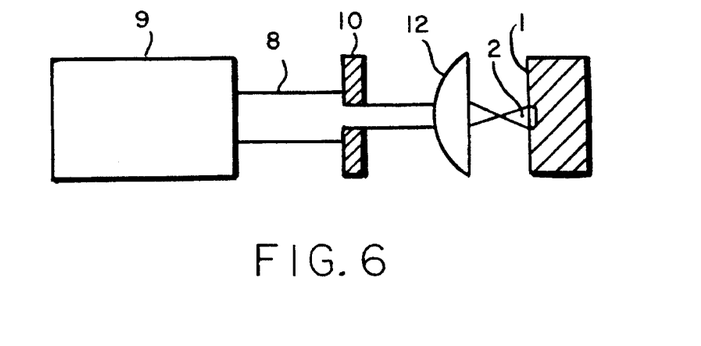
FIG. 6 is a schematic view of an apparatus for radiating an ArF excimer laser beam used for a defect compensation method according to a second example of the present invention.

An ArF excimer laser beam 8 is radiated to a defect portion at a surface of a transparent plate 1 formed of glass or the like, by use of a mask imaging method using an apparatus shown in FIG. 6.

A pattern mask 10 having an opening formed of a metal plate or the like is provided on a path of the ArF excimer laser beam 8 emitted by an excimer laser emitter 9. The ArF excimer laser beam 8 is transmitted through the pattern mask 10 and is reduced by a convex lens 12 to be projected and radiated to a radiation portion 2 in a pattern corresponding to the opening of the pattern mask 10. As the pattern mask 10, for example, a metal plate having a specified pattern of opening obtained by etching can be used.

Figure 7:
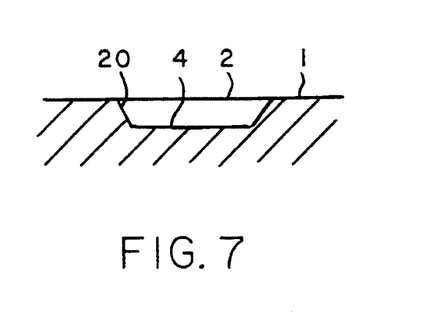
FIG. 7 is a cross sectional view of a portion obtained by a conventional defect compensation method.
Figure 8:
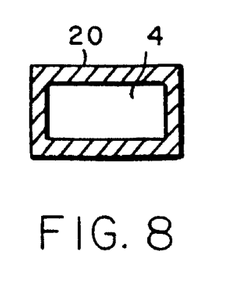
FIG. 8 is a schematic view of a profile of a portion obtained by a defect compensation method which is visually recognized as a shadow.
Figure 9:
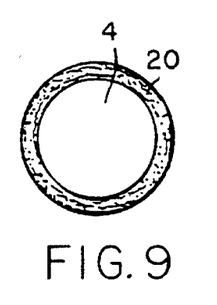
FIG. 9 is a schematic view of another profile of a portion obtained by a defect compensation method which is visually recognized as a shadow.

In the case where a defect having a width of 0.3 mm or less and a depth of 0.04 mm or less is compensated for, using the apparatus shown in FIG. 6, a processed surface 4 shown in FIG. 7 is obtained. As is shown in FIG. 7, there is an undesirable possibility that an edge 20 of the processed surface 4 is visually recognized as a shadow when observed from above. Especially when the transparent plate 1 is formed of glass, 1,000 or more shots of the ArF excimer laser beam 8 having a radiation energy of 5 $J/cm^2$ or higher is required in order to completely compensate for the defect. Accordingly, the undesirable possibility that the edge 20 is recognized as a shadow is high. When the ArF excimer laser beam 8 is projected in a rectangular pattern, a rectangular edge 20 is clearly projected and recognized as a shadow as is shown in FIG. 8. When the ArF excimer laser beam 8 is projected in a circular pattern, a circular edge 20 is clearly projected and recognized as a shadow as is shown in FIG. 9. Although the light transmitting property of the display plane is maintained due to a smooth processed surface 4 with no microscopic ruggedness, this shadow may provide another display defect.

In this example, the ArF excimer laser beam 8 is radiated in the following manner to make the edge 20 unclear.

Figure 10:
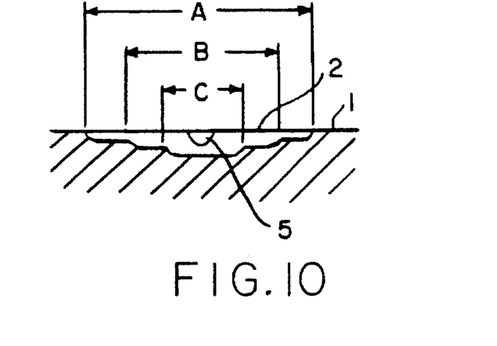
FIG. 10 is a cross sectional view of a portion obtained by the defect compensation method according to the second example of the present invention.

One thousand shots or less of the ArF excimer laser beam 8 are radiated to the radiation portion 2 while the size of the beam is changed step by step. As is shown in FIG. 10, for example, several hundred shots of the ArF excimer laser beam 8 having a size A are radiated, then several hundred shots of the ArF excimer laser beam 8 having a size B are radiated, and finally several hundred shots of the ArF excimer laser beam 8 having a size C are radiated. The beam size can be changed, for example, by using a plurality of the pattern masks 10 having different sizes of openings one after another. Alternatively, a pattern mask having a plurality of openings having different sizes from one another may be provided. In this case, the beam size is changed by allowing the ArF excimer laser beam 8 to be transmitted through the different openings.

In this example, the radiation energy of the ArF excimer laser beam 8 is 40 $mJ/cm^2$ for all of the sizes A, B, and C. The sizes A, B, and C are 0.5 mm, 0.4 mm, and 0.3 mm, respectively.

As is shown in FIG. 10, the processed surface 4 obtained according to this example is slightly deep at a center and gets gradually shallower toward a periphery thereof. In this state, the processed surface 4 has no clear edge to be visually recognized as a shadow when observed from above. Moreover, due to the smoothness of the processed surface 4 with no microscopic ruggedness, the light transmitting property thereof is not spoiled. As a result, a satisfactory display plane is obtained.

Further, the defect compensation according to this example takes only 1 minute for each defect on average, in contrast with 10 to 20 minutes in the case of a conventional method. Accordingly, the compensation cost can be reduced.

Still further, substantially no residual powders are generated in contrast with a conventional rubbing method by which rubbing powders are splashed to cause various problems.

EXAMPLE 3

In this example, an ArF excimer laser beam 8 is radiated to a radiation portion 2 so as to have an energy which is high at a center and low at a periphery of the radiation portion 2. In this way, a processed surface 4 having no clear edge to be visually recognized as a shadow when observed from above is obtained.

Figure 11:
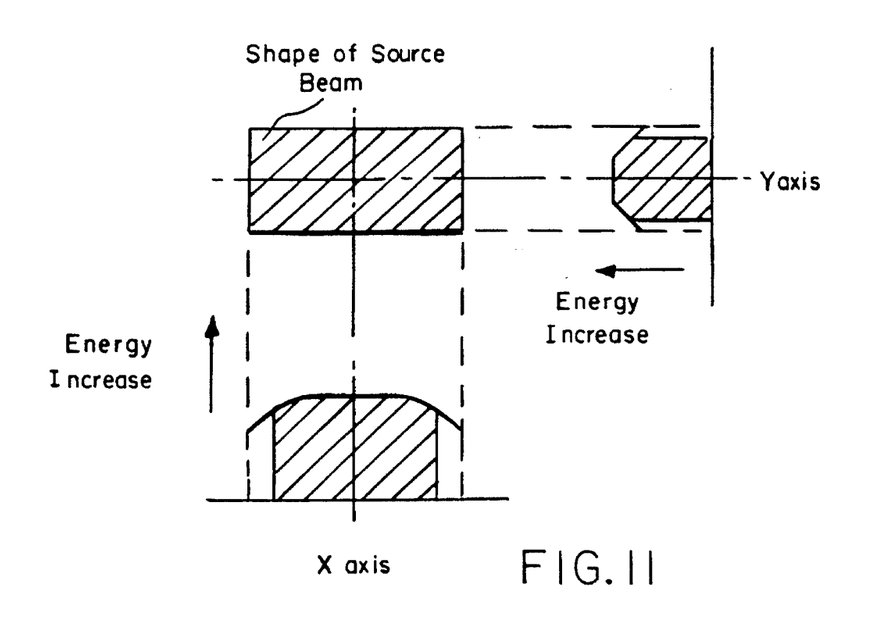
FIG. 11 is a view illustrating energy distribution of an ArF excimer laser beam used in a defect compensation method according to a third example of the present invention.

In a usual laser radiation, a part of the laser beam which has a uniform energy level distribution both in an X axis and a Y axis as is indicated by hatching in FIG. 11 is used. In this example, a peripheral part of the laser beam where the energy level distribution shows a curve (indicated by mesh) is also used. By radiating such a part of the laser beam 8 to the radiation portion 2, a processed surface 4 which is slightly deep at a center and gets gradually shallower toward a periphery thereof is obtained.

Figure 12:
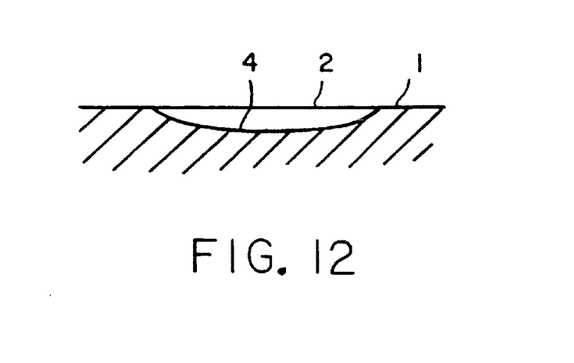
FIG. 12 is a cross sectional view of a portion obtained by the defect compensation method according to the third example of the present invention.

In this example, 500 shots of the ArF excimer laser beam 8 having a radiation energy of 40 J/cm$^2$ at a center of the radiation portion 2 is radiated. This radiation energy is gradually lowered toward a periphery thereof. As is shown in FIG. 12, the processed surface 4 is slightly deep at a center and gets gradually shallower toward a periphery thereof. In this state, the processed surface 4 has no clear edge to be visually recognized as a shadow when observed from above. Further, due to the smoothness of the processed surface 4 with no microscopic ruggedness, the light transmitting property thereof is not spoiled. As a result, a satisfactory display plane is obtained. The defect compensation takes only 1 minute for each defect on average, and further no residual powders are generated.

EXAMPLE 4

Figure 13:
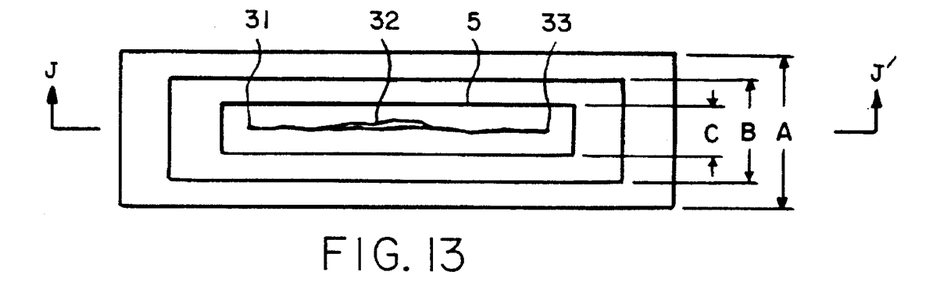
FIG. 13 is a top view of a portion, to which an ArF excimer laser beam is radiated by a defect compensation method according to a fourth example of the present invention.
Figure 14:
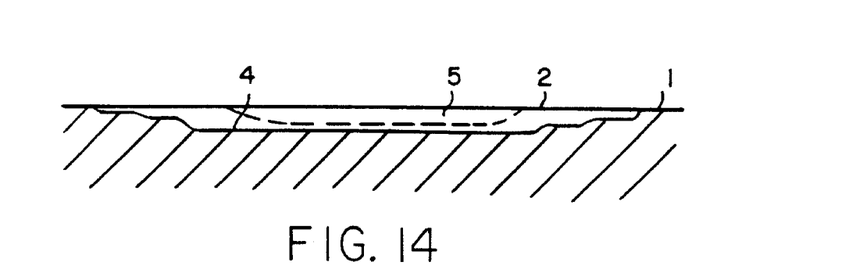
FIG. 14 is a cross sectional view of a portion along line J–J' of FIG. 13 obtained by the defect compensation method according to the fourth example of the present invention.

A linear defect 5 at a transparent plate 1 formed of glass or the like as is shown in FIG. 13 is compensated for by radiating an ArF excimer laser beam 8 while the number of shots of the beam is changed. FIG. 14 shows a cross sectional view along line J–J' of a portion obtained by the defect compensation.

In more detail, the defect compensation is performed in the following manner.

First, the defect 5 at a surface of the transparent plate 1 is recognized by an image processing apparatus. As is shown in FIG. 13, coordinates of a plurality of points 31, 32 and 33 are measured with respect to an arbitrary point as an origin. After it is confirmed that the defect 5 is substantially linear, a distance required for the defect compensation is calculated based on the coordinates of the points 31 and 33, in order to find out by which beam size A, B or C the defect compensation is possible.

Next, a display apparatus having the transparent plate 1 is mounted on a movable stage (not shown), and the ArF excimer laser beam is radiated to the radiation portion 2 while the stage is moved based on the coordinates obtained by the image recognition.

In this example, the ArF excimer laser beam having a size of A is radiated with a radiation energy of 40 J/cm$^2$.

The number of shots may be adjusted in accordance with the depth and length of the defect 5.

In FIG. 14, a processed surface 4 is slightly deep at a center and gets gradually shallower toward a periphery thereof. In this state, the processed surface 4 has no clear edge to be visually recognized as a shadow when observed from above. Further, due to the smoothness of the processed surface 4 with no microscopic ruggedness, the light transmitting property thereof is not spoiled. As a result, a satisfactory display plane is obtained. The defect compensation takes only 1 minute for each defect 5 on average, and further no residual powders are generated.

EXAMPLE 5

Figure 15:
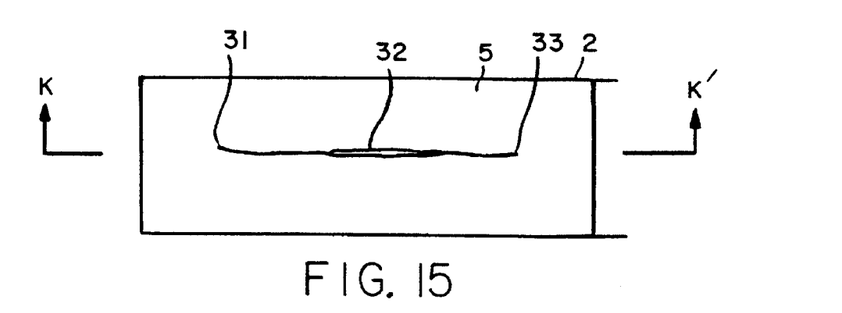
FIG. 15 is a top view of a portion, to which an ArF excimer laser beam is radiated by a defect compensation method according to a fifth example of the present invention.
Figure 16:
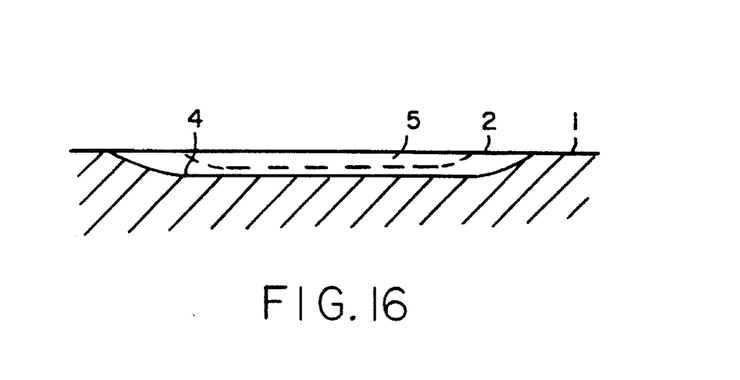
FIG. 16 is a cross sectional view along line K–K' of FIG. 15 of a portion obtained by the defect compensation method according to the fifth example of the present invention.

According to this example, a linear defect 5 at a transparent plate 1 formed of glass or the like as is shown in FIG. 15 is compensated for, by radiating an ArF excimer laser beam 8. The ArF excimer laser has a radiation energy which is distributed to be high at a center and low at a periphery thereof at a radiation portion 2 as in the third example. FIG. 16 shows a cross sectional view along line K–K' of FIG. 15 of a portion obtained by the defect compensation.

In more detail, the defect compensation is performed in the following manner.

First, the defect 5 at a surface of the transparent plate 1 is recognized by an image processing apparatus in the same manner as in the fourth example.

Next, a display apparatus having the transparent plate 1 is mounted on a movable stage, and the ArF excimer laser beam is radiated to a radiation portion 2 while the stage is moved based on the coordinates obtained by the image recognition. By moving the stage in the vicinity of a starting point and a stopping point of the movement faster than at other points, a processed surface 4 having no clear edge to be visually recognized as a shadow when observed from above is obtained.

In this example, the ArF excimer laser beam is radiated with a radiation energy of 40 J/cm$^2$. The moving speed of the stage is 2 in the vicinity of the starting point and the stopping point while 1 at the other points.

The number of shots may relatively be adjusted in accordance with the depth and length of the defect 5.

As is shown in FIG. 16, the resultant processed surface 4 is slightly deep at a center and gets gradually shallower toward a periphery thereof. In this state, the processed surface 4 has no clear edge to be visually recognized as a shadow when observed from above. Further, due to the smoothness of the processed surface 4 with no microscopic ruggedness, the light transmitting property thereof is not spoiled. As a result, a satisfactory display plane is obtained.

The defect compensation takes only 1 minute for each defect 5 on average, and further no residual powders are generated.

Further, by pasting a masking tape such as a cellophane tape on an area of the transparent plate 1 except for the radiation portion, fine powders splashed during the compensation process can be collected, and also formation of an edge at the border between the radiation portion and the other area can be prevented.

In the second to the fifth examples, the size of the ArF excimer laser beam 8 and the number of shots may be varied.

EXAMPLE 6

Figure 17:
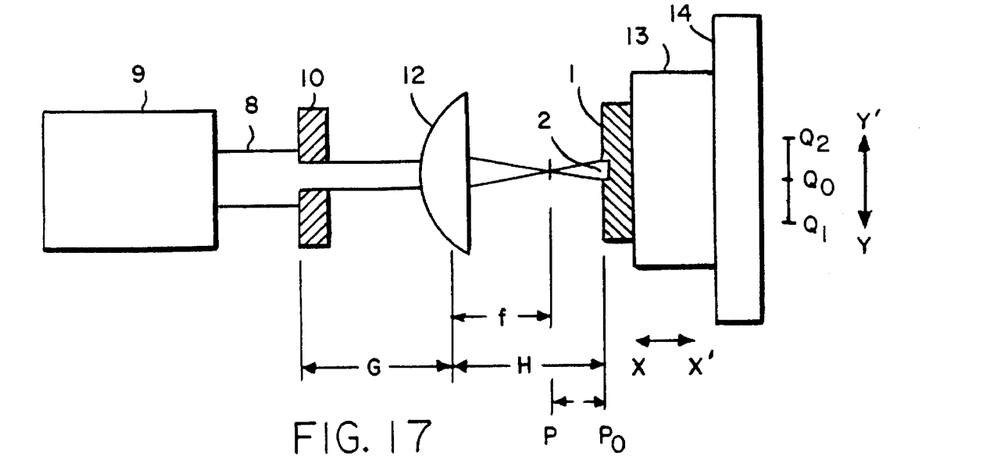
FIG. 17 is a schematic view of an apparatus for radiating an ArF excimer laser beam used in a defect compensation method according to a sixth example of the present invention.

A defect 5 at a surface of a transparent plate 1 formed of glass or the like is compensated for by radiating an ArF excimer laser beam 8 by a mask imaging method using an apparatus shown in FIG. 17.

In the apparatus shown in FIG. 17, a pattern mask 10 formed of a metal plate or the like is provided on a path of the ArF excimer laser beam 8 emitted by an excimer laser emitter 9. The ArF excimer laser beam 8 is transmitted through the pattern mask 10 and is reduced by a convex lens 12 to be projected and radiated to a radiation portion 2 of the transparent plate 1. As the pattern mask 10, for example, a metal plate having a specified pattern of opening obtained by etching can be used.

The reduction ratio and the radiation energy of the ArF excimer laser beam 8 are obtained in the following manner.

Where the distance between the pattern mask 10 and the convex lens 12 is G, the distance between the convex lens 12 and the surface of the transparent plate 1 is H, and the distance of the convex lens 12 is f, the relationship among G, H, and f is:

$$1/G+1/H=1/f$$

from a formula concerning lenses (Gauss' theorem).

The reduction ratio M of the ArF excimer laser beam 8 is:

$$M=G/H$$

Where the energy density at an emitting point of the excimer laser emitter 9 is El, the energy density $E_2$ at a surface of the transparent plate 1 is:

$$E_2=M^2 \cdot E_1$$

By adjusting and controlling the relationship among G, H and f in terms of distance, the reduction and projection can accurately be performed at the radiation portion 2.

Further, by setting the above-mentioned relationship among G, H and f very precisely, fluctuation of the energy density $E_2$ at the radiation portion 2 is reduced, thereby stabilizing the processing precision in a depth direction of the defect 5.

In the state where the pattern mask 10, the convex lens 12, and the surface of the transparent plate 1 are fixed with respect to one another in terms of distance, there is an undesirable possibility that an edge of a processed surface 4 is visually recognized as a shadow when observed from above. When the ArF excimer laser beam 8 is projected in a rectangular pattern, a rectangular edge 20 is clearly projected and recognized as a shadow as is shown in FIG. 8. When the ArF excimer laser beam 8 is projected in a circular pattern, a circular edge 20 is clearly projected and recognized as a shadow as is shown in FIG. 9. Although the light transmitting property of the display plane is maintained by the smooth processed surface 4 with no microscopic ruggedness, this shadow may provide another display defect.

In this example, the ArF excimer laser beam 8 is radiated in the following manner to make the edge 20 unclear.

The apparatus shown in FIG. 17 includes a stage 13 movable in a direction of line X–X' and a stage 14 movable in a direction of line Y–Y'. In such an apparatus, a distance between the convex lens 12 and the surface of the transparent plate 1 is sequentially changed as follows.

The stage 13 is moved in the direction of line X–X', thereby moving the radiation portion 2 in a direction of being distanced from the convex lens 12 or in a direction of approaching the convex lens 12. Namely, the radiation portion 2 is moved from a position where the profile of the projected pattern is focused and thus clearly displayed thereon to a position where the profile of the projected pattern is not focused and thus unclearly expanded. Simultaneously, the stage 14 is moved in the direction of line Y–Y'. By this movement, the ArF excimer laser beam 8 is radiated to different parts of the radiation portion 2 sequentially.

Figure 18:
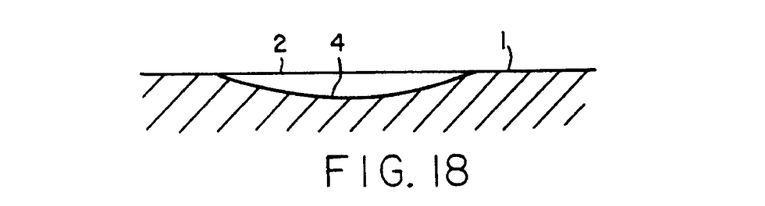
FIG. 18 is a cross sectional view of a portion obtained by the defect compensation method according to the sixth example of the present invention.

FIG. 18 is a cross sectional view of a portion obtained according to this example. As is shown in FIG. 18, a processed surface 4 is slightly deep at a center and gets gradually shallower toward a periphery thereof. In this state, the processed surface 4 has no clear edge to be visually recognized when observed from above. Further, due to the smoothness of the processed surface 4 with no microscopic ruggedness, the light transmitting property thereof is not spoiled.

Figure 19:
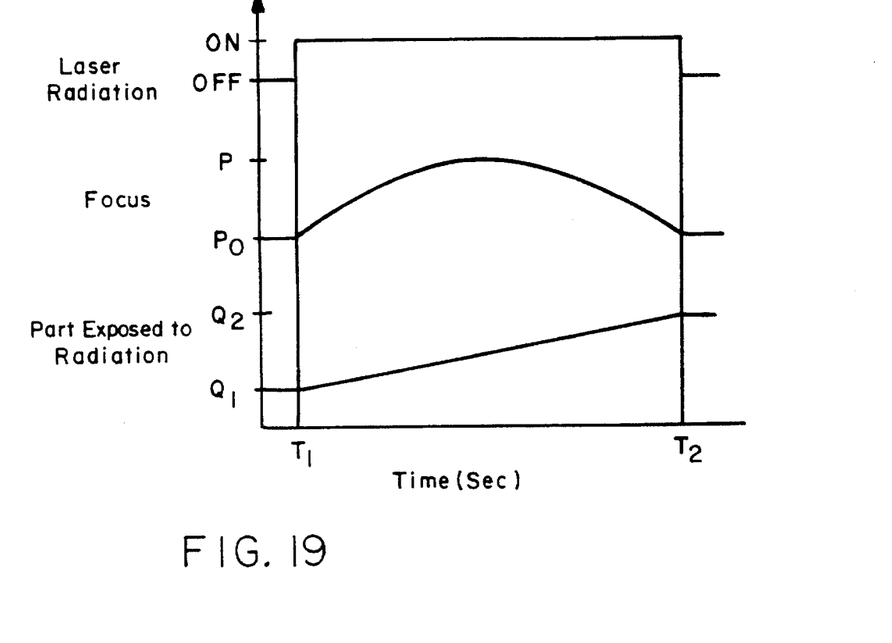
FIG. 19 is a timing chart for the defect compensation method according to the sixth example of the present invention.

FIG. 19 is a timing chart showing the relationship between the degree of focus and the movement of the part exposed to the ArF excimer laser beam 8 during the radiation thereof (from time $T_1$ to time $T_2$).

At time $T_1$, the radiation portion 2 is relatively far from convex lens 12 (position $P^O$), and thus the profile of the projected pattern is not focused thereon. When the radiation portion 2 approaches the convex lens 12 (position P), the profile of the projected pattern is focused thereon. Then, the radiation portion 2 is again distanced from the convex lens 12 (toward position $P^O$).

The radiation portion 2 is simultaneously moved in the direction of line Y–Y' from $Q_1$ to $Q_2$ through $Q_O$, so as to allow the ArF excimer laser beam 8 to be radiated to different parts of the radiation portion 2. The distance of the movement in the direction of line Y–Y' can be adjusted in accordance with the size of the defect 5.

As a result of the above process, a processed surface 4 which is slightly deep at a center and gets gradually shallow toward a periphery thereof is obtained.

The defect compensation takes only 1 minute for each defect on average, which reduces the compensation cost compared with a conventional rubbing method which requires 10 to 20 minutes to compensate for one defect.

Further, no residual powders are generated, which solves the problem that the powders splashed during the process causes other inconveniences.

EXAMPLE 7

Figure 20:
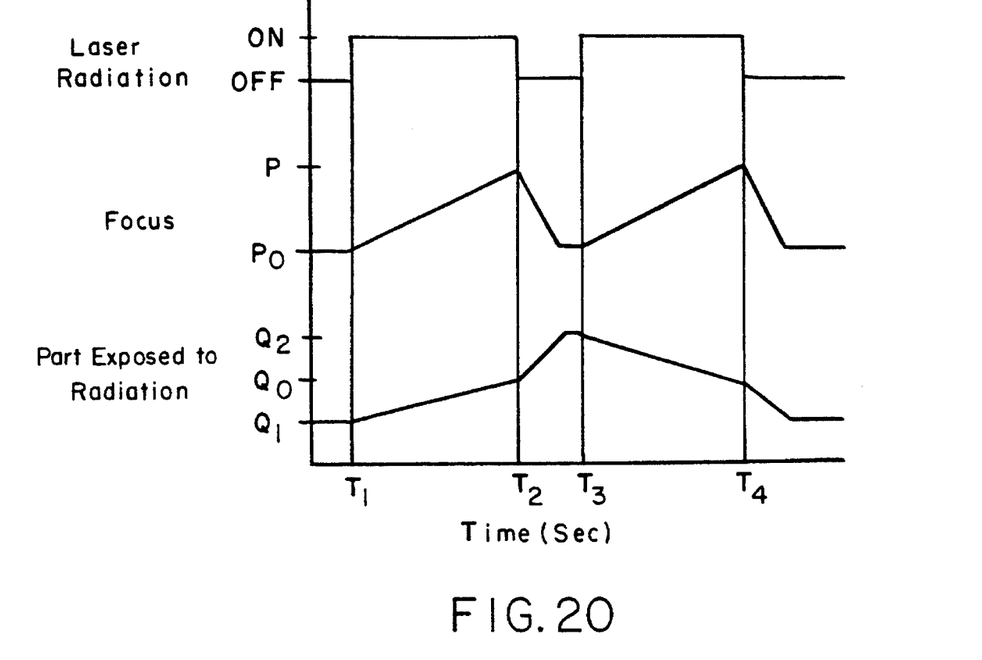
FIG. 20 is a timing chart for a defect compensation method according to a seventh example of the present invention.

FIG. 20 is another timing chart showing the relationship between the degree of focus and the movement of the portion exposed to the ArF laser beam 8 during the radiation thereof (from time $T_1$ to time $T_4$), which is performed by use of the apparatus shown in FIG. 17.

The timing chart shown in FIG. 20 concerns the radiation performed for compensating for a defect 5 which is relatively deep. The ArF excimer laser beam radiation is performed twice, namely, from time $T_1$ to time $T_2$ (during which time the stage 14 is moved from $Q_1$ to $Q_O$) and from time $T_3$ to time $T_4$ (during which time the stage 14 is moved from $Q_2$ to $Q_O$). The degree of focus is changed twice accordingly.

According to this example, a processed surface 4 which is slightly deep at a center and gets gradually shallower toward a periphery thereof is obtained. In this state, the processed surface 4 has no clear edge to be visually recognized when observed from above. Further, due to the smoothness of the processed surface 4 with no microscopic ruggedness, the light transmitting property thereof is not spoiled. As a result, a satisfactory display plane is obtained.

The defect compensation takes only 1 minute for each defect 5 on average, and further no residual powders are generated.

The timing relationship of the degree of focus and the movement of the part exposed to the ArF excimer laser beam 8 is not limited to the abovementioned ones in the sixth and the seventh examples. As the pattern mask 10, various other types may be used.

EXAMPLE 8

Figure 21:
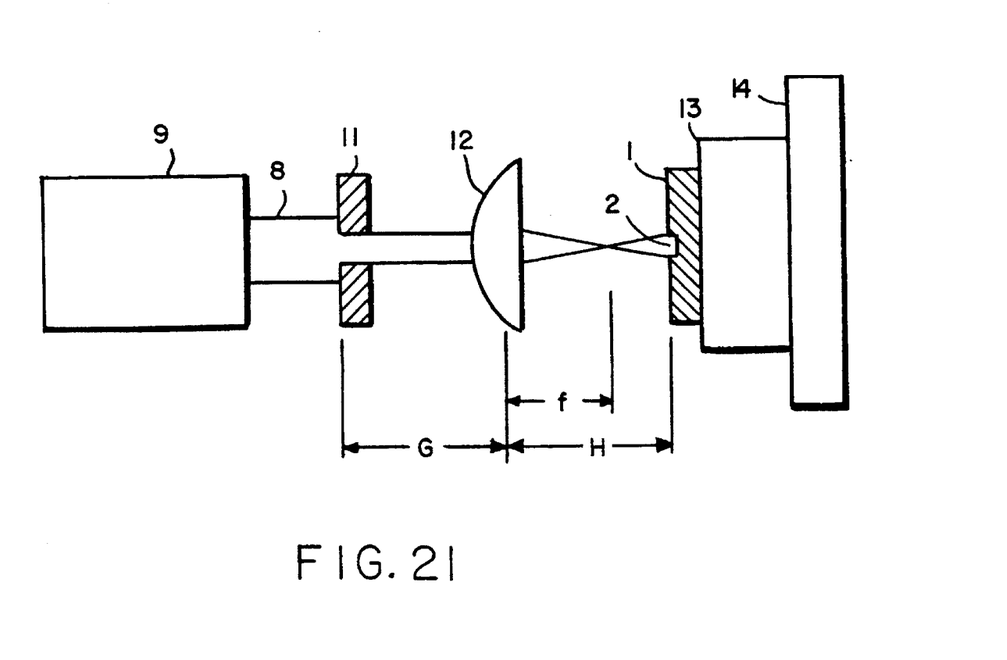
FIG. 21 is a schematic view of an apparatus for radiating an ArF excimer laser beam used in a defect compensation method according to an eighth example of the present invention.

An ArF excimer laser beam 8 is radiated to a radiation portion 2 using an apparatus shown in FIG. 21. Identical members as those in FIG. 17 bear identical reference numerals, respectively.

Figures 22, 23:
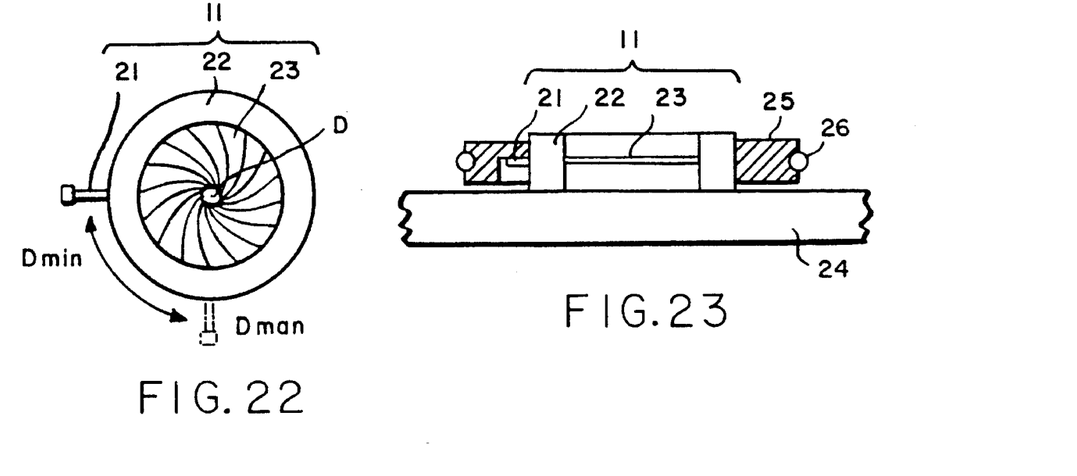
FIG. 22 is a top view of an iris mask used in the defect compensation method according the eighth example of the present invention.
FIG. 23 is a cross sectional view of a mechanism for changing the diameter of the iris mask shown in FIG. 22.

The apparatus shown in FIG. 21 includes an iris mask 11 used as a pattern mask shown in FIG. 22. Blade-like members 23 forming a circular opening at a center of the iris mask 11 are opened or closed by a pin 21 provided at a side of a housing 22. The pin 21 is movable at an angle of substantially 90° between a position corresponding to a minimum diameter Dmin of the opening to a maximum diameter Dmax of the opening, thereby changing the diameter D of the opening.

The pin 21 is driven, for example, in the following manner. As is shown in FIG. 23, a bottom surface of the housing 22 is fixed on a base plate 24 by an adhesive or the like, and a rotating pulley 25 is engaged around an outer peripheral surface of the housing 22. The pulley 25 is driven by a motor or the like (not shown) through a belt 26. When the pulley 25 is rotated, the pin 21 is moved, thereby sequentially changing the diameter D of the opening. By using a motor of a reversible type, the pin 21 can be moved both in forward and reverse directions.

In such an apparatus also, in the state where the iris mask 11, the convex lens 12, and the surface of the transparent plate 1 are fixed with respect to one another in terms of distance, there is an undesirable possibility that an edge 20 of a processed surface 4 is visually recognized as a shadow when observed from above as is shown in FIG. 9. In this example, such an inconvenience is avoided by radiating the ArF excimer laser beam 8 in the following manner.

Figure 24:
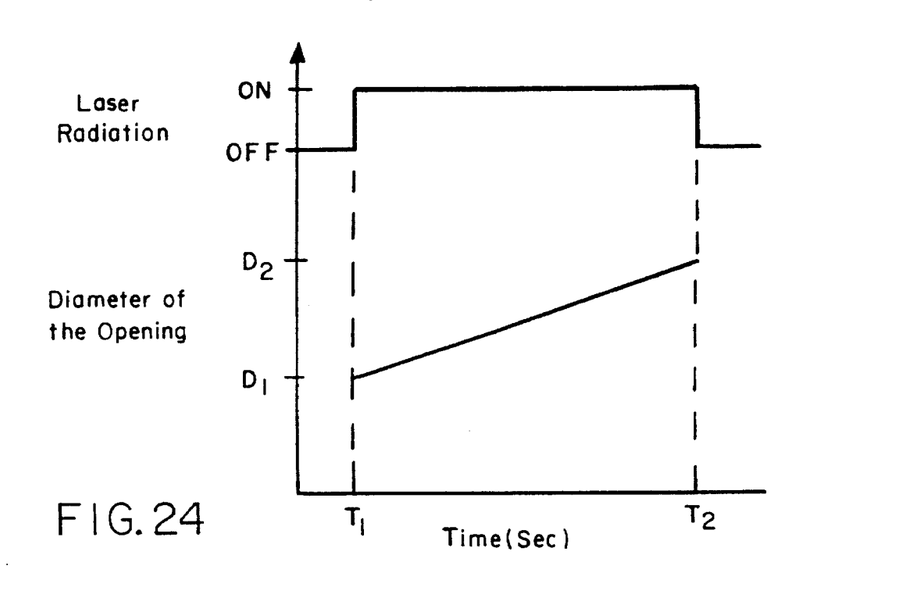
FIG. 24 is a timing chart for a defect compensation method according to the eighth example of the present invention.

The iris mask 11 is provided on a path of the ArF excimer laser beam 8 so that the opening of the iris mask 11 can be larger than a defect 5. As is shown in FIG. 24, and the diameter D of the opening of the iris mask 11 is sequentially increased from $D_1$ to $D_2$ during the radiation (from time $T_1$ to time $T_2$).

Figure 25:
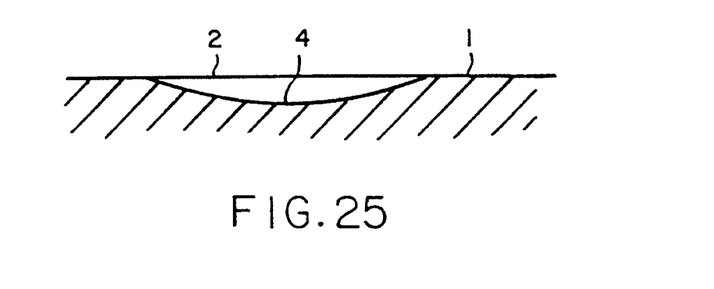
FIG. 25 is a cross sectional view of a portion obtained by the defect compensation method according to the eighth example of the present invention.

According to this method, the ArF excimer laser beam 8 is radiated to a periphery of the processed surface 4 for a shortest period of time. The resultant processed surface 4 is slightly deep at a center and gets gradually shallower toward a periphery thereof. In this state, the processed surface 4 has no clear edge to be visually recognized when observed from above. Further, due to the smoothness of the processed surface 4 with no microscopic ruggedness, the light transmitting property thereof is maintained. As a result, a satisfactory display plane is obtained.

The defect compensation takes only 1 minute for each defect 5 on average, and further no residual powders are generated.

The change in the diameter of the opening of the iris mask 11 is not limited to the one described in this example. Further, the change in the degree of focus and the movement of the part exposed to the ArF excimer laser beam 8 may be utilized in combination with the change in the diameter of the iris mask 11.

In the first to the eighth examples, the transparent plate 1 is formed of glass. Instead of glass, any other material which absorbs an ArF excimer laser beam at a surface thereof may be used as the transparent plate 1. For example, a resin such as plastic or an acrylic resin may be used.

As is apparent from the above description, according to the present invention, a processed surface with no microscopic ruggedness is obtained by use of an ArF excimer laser beam. Thus, defect compensation can be performed without spoiling the light transmitting property of the display plane. Since the time required for the defect compensation is shortened, the compensation cost is reduced. Since the amount of the residual powders generated by the compensation process is significantly smaller when compared with the case of a conventional method using rubbing powders or the like, the operational environment can be clean and problems caused by the residual powders or rubbing powders can be avoided. As a result, satisfactory display planes can be obtained with a high yield. Even in the case where an LSI or the like is mounted on the transparent substrate subjected to the defect compensation, there is no undesirable possibility that the LSI is destroyed by static electricity generated by vibration or friction.

By radiating an ArF excimer laser beam while the size of the beam is changed or by radiating an ArF excimer laser beam to have an energy which is high at a center and low at a periphery of a radiation portion, a satisfactory processed surface having no clear edge to be visually recognized as a shadow can be obtained.

Alternatively, such a satisfactory processed surface can be obtained by changing the degree of focus and exposing different parts of the radiation portion to the ArF excimer laser beam during the radiation thereof.

In the case where an iris mask is used as a pattern mask, a satisfactory processed surface having no clear edge to be visually recognized as a shadow can be obtained by sequentially changing the diameter of a circular opening of the iris mask.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A defect compensation method for smoothing a surface of a synthetic transparent plate by radiating an ArF excimer laser beam to a defect at the surface.

2. A defect compensation method for smoothing a surface of a synthetic transparent plate according to claim 1, wherein the ArF excimer laser beam is radiated by use of a mask having an opening which is shaped in accordance with the shape of the defect.

3. A defect compensation method for smoothing a surface of a synthetic transparent plate according to claim 1, wherein the ArF excimer laser beam is radiated through a lens.

4. A defect compensation method for smoothing a surface of a synthetic transparent plate according to claim 1, wherein the ArF excimer laser beam is radiated while the size of the beam at the defect is changed to a plurality of values.

5. A defect compensation method for smoothing a surface of a synthetic transparent plate according to claim 4, wherein the size of the beam is changed by exchanging a plurality of masks each having an opening of a different size from one another.

6. A defect compensation method for smoothing a surface of a synthetic transparent plate according to claim 4, wherein the size of the beam is changed by use of a mask having a plurality of openings of different sizes.

7. A defect compensation method for smoothing a surface of a synthetic transparent plate according to claim 1, wherein the ArF excimer laser beam is radiated so as to have an energy which is high at a center and low at a periphery of the defect.

8. A defect compensation method for smoothing a surface of a synthetic transparent plate according to claim 1, wherein the ArF excimer laser beam has a smaller size than the size of the defect, and wherein the synthetic transparent plate having the defect is moved so as to allow different portions of the defect to be irradiated sequentially by the ArF excimer laser beam and simultaneously the number of shots of the ArF excimer laser beam is changed.

9. A defect compensation method for smoothing a surface of a synthetic transparent plate according to claim 8, wherein the number of the shots of the beam is changed in accordance with at least one of a depth and a length of the defect.

10. A defect compensation method for smoothing a surface of a synthetic transparent plate according to claim 8, wherein the transparent plate having the defect is moved slowly when a center of the defect is exposed to the ArF excimer laser beam and fast when a periphery of the defect is exposed to the ArF excimer laser beam.

11. A defect compensation method for smoothing a surface of a synthetic transparent plate according to claim 3, wherein the degree of focus of the ArF excimer laser beam is changed and also the synthetic transparent plate having the defect is moved so as to allow different portions of the defect to be irradiated sequentially by the ArF excimer laser beam.

12. A defect compensation method for smoothing a surface of a synthetic transparent plate according to claim 11, wherein the change in the degree of focus and the movement of the synthetic transparent plate having the defect are performed by moving a stage having the synthetic transparent plate thereon in a direction substantially parallel to the radiation of the ArF excimer laser beam and a direction crossing the radiation.

13. A defect compensation method for smoothing a surface of a synthetic transparent plate according to claim 1, wherein the ArF excimer laser beam is radiated by use of an iris mask having an opening which is larger than the defect.

14. A defect compensation method for smoothing a surface of a synthetic transparent plate according to claim 13, wherein a diameter of the opening of the iris mask is sequentially changed during the radiation of the ArF excimer laser beam.

15. A defect compensation method for smoothing a surface of a synthetic transparent plate according to claim 1, wherein the ArF excimer laser beam is radiated in the state where the surface of the synthetic transparent plate is masked except for the defect.

16. A defect compensation method for smoothing a surface of a synthetic transparent plate according to claim 1, wherein the synthetic transparent plate is formed of glass.

17. A defect compensation method for smoothing a surface of a synthetic transparent plate according to claim 1, wherein the synthetic transparent plate is a display plane of a display apparatus.

18. A defect compensation method for smoothing a surface of a synthetic transparent plate according to claim 1, wherein the transparent plate is formed of a glass or a resin.

19. A defect compensation method for smoothing a surface of a synthetic transparent plate according to claim 1, wherein the transparent plate is essentially flat.

20. A defect compensation method according to claim 1, wherein the defect is a concave defect on the surface of the transparent plate.

21. A defect compensation method according to claim 1, wherein the synthetic transparent plate is a display plane of a liquid crystal display.

22. A defect compensation method according to claim 1, wherein the radiated surface is smooth with essentially no microscopic roughness.

23. A defect compensation method according to claim 22, wherein the light transmitting property of the transparent plate is not reduced as a result of the radiating by the ArF excimer laser beam.

24. A defect compensation method for smoothing a surface of a synthetic transparent plate formed of a glass or a resin by radiating an ArF excimer laser beam to a defect at the surface.

25. A defect compensation method for smoothing a surface of a synthetic transparent plate by radiating an ArF excimer laser beam to a defect at the surface, wherein the ArF excimer laser beam is radiated in the state where the surface of the synthetic transparent plate is masked except for the defect.

* * * * *